No. 779,272. PATENTED JAN. 3, 1905.
C. H. FELTEN.
WRENCH.
APPLICATION FILED JULY 19, 1904.
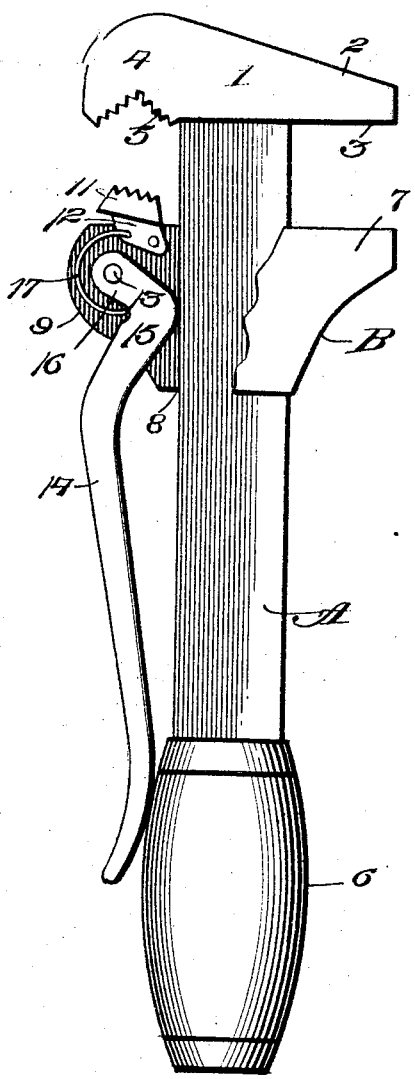
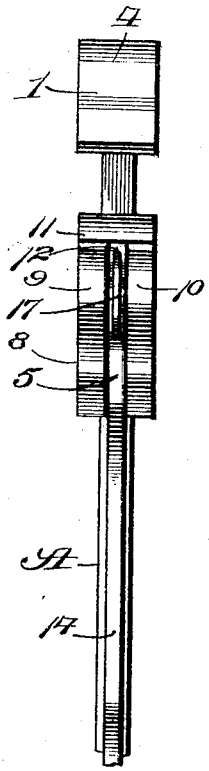
Witnesses
Phil E. Barner
A. G. Heylmun
Inventor
Charles H. Felten
By Victor J. Evans
Attorney No. 779,272. Patented January 3, 1905.

UNITED STATES PATENT OFFICE.

CHARLES H. FELTEN, OF NEW BALTIMORE, PENNSYLVANIA.

WRENCH.

SPECIFICATION forming part of Letters Patent No. 779,272, dated January 3, 1905.

Application filed July 19, 1904. Serial No. 217,206.

*To all whom it may concern:*

Be it known that I, CHARLES H. FELTEN, a citizen of the United States, residing at New Baltimore, in the county of Somerset and State of Pennsylvania, have invented new and useful Improvements in Wrenches, of which the following is a specification.

My invention relates to improvements in wrenches; and the object is to provide a combined nut and pipe wrench the movable jaw of which is easily and quickly adjusted on the shank to any position relative to the object to be acted on, the movable jaw being provided with an automatically-adjustable grip-piece pivotally supported therein.

I also propose to provide a wrench which is simple in construction, strong, efficient in use, and especially quick in action; and with these objects in view the invention consists in an improved article of manufacture, as will be hereinafter fully described and the asserted novelty then particularly pointed out and distinctly claimed.

I have fully and clearly illustrated the improvements in the accompanying drawings, to be taken as a part of this specification.

Reference being had to the drawings, Figure 1 is a side view, partly in section, of the complete implement. Fig. 2 is a top plan view of the implement with the handle broken off.

Referring to the drawings, A designates the shank or bar of the implement, consisting of a strong metal bar made plain and smooth and having parallel side faces and edges, as shown, and on the outer end of which is a fixed jaw 1, one portion of which is extended from the shank, as at 2, with a plane inner face 3 to engage against the side of a square nut, and the other end of which is extended, as at 4, in opposite direction and is formed with an angular recess 5, having its gripping-face corrugated, as shown, to take strong contact with a pipe or similar object in a well-known manner. On the other end of the shank is fixed a handle 6 of any suitable shape and secured in position by any proper means.

B designates the movable jaw, provided with an extension 7, having a plane inner face to act in conjunction with the face 3 of the fixed jaw in acting on square nuts, and the other extension, 8, of which is formed in two parallel parts having a longitudinal vertical space between them, as indicated in the drawings at 9 10, between which parts the shank of the bar is slidably disposed, as shown. The extension 8 is provided with a grip-piece 11, having a corrugated or notched gripping-face, as shown, and formed with a shank 12, reduced to provide shoulders at its junction with the grip-piece to bear against the faces of the ends of the parallel extensions. The grip-piece 11 is pivotally and eccentrically supported between the parallel extensions 9 and 10 of the movable jaw, substantially as seen in Fig. 1 of the drawings.

Between the parts 9 10 at their outer portion is fixed a strong pin 13. On the pin 13 is pivotally mounted a lever 14, consisting of a handle portion and an inner end portion bent inward, as at 15, toward the shank or bar of the implement and then turned upward, as at 16, and the end of the turned-up portion pivotally supported on the pin 13. The bend or knuckle thus formed in the bent part of the lever bears or presses on the edge of the shank-bar of the wrench when the lever is in the position shown in Fig. 1 of the drawings, and in such position or action holds the movable jaw rigidly in such position as it may have been moved to, and when the lever is lifted so as to free it from contact or pressure with the shank the movable jaw may be moved to any desired position speedily and with certainty. To hold the knuckle of the lever normally in contact with the shank-bar, a bent or arched spring 17 is provided, having one end fixed in the shank of the pivotally-supported grip-piece 11 and extending in an arch over the pivotal end of the lever has its free end arranged to bear on the outer face of the bent-up part 16 of the lever at its base, substantially as shown in the drawings. It will be perceived that by the arrangement of the arched spring the grip-piece 11 is resiliently held in operative position, and at the same time the force the spring exerts on the lever holds that element or member from swinging away from preliminary contact with the shank-bar.

It will be observed that the pivotal connection of the gripping-piece 11 is disposed inside the plane of the pivotal connection of the part 15 of the lever 14 or closer to the shank-bar A, and that by this disposition of the pivotal connections the locking piece or portion 15 is disposed to lie wholly in rear of the plane of said gripping-piece, thus enabling the parts to be better housed or shielded and arranged in closer relation to the shank-bar and preventing them from having interference in the operation of the tool. The arcuate form of the spring 17 and its peculiar arrangement, as described, adapts the parts to be arranged in the relation stated, as will be readily understood.

Having thus described my improvements, what I claim, and desire to secure by Letters Patent, is—

1. A combined nut and pipe wrench, comprising a shank-bar, a fixed jaw extending in both directions from the bar, one of said extensions having a plane face and the other a corrugated recess, a movable jaw having a plane face to coöperate with the plane face of the fixed jaw and a pivoted gripping-piece to coöperate with the corrugated recess in the fixed jaw, a pivoted locking-piece to lock the movable jaw to the shank, said locking-piece being disposed wholly in rear of said gripping-piece and having its pivot disposed in a plane beyond the pivot of the gripping-piece, and an arcuate spring extending around the pivoted end of the locking-piece and engaging the same rearwardly and inside of the plane of its pivot and connected to the gripping-piece outside the plane of its pivot, substantially.

2. A combined nut and pipe wrench comprising a shank-bar, a fixed jaw secured in one end of said bar and provided with a plane surface and with a corrugated recess, a movable jaw carrying a plane face to coöperate with the plane surface of the fixed jaw, and a grip-piece pivoted in the movable jaw to coöperate with the recess in the fixed jaw, means for frictionally locking the movable jaw in fixed relation to the shank-bar and a spring connection between said locking means and the grip-piece, said spring connection being secured in the grip-piece and bearing on said locking means adjacent its frictional engagement with the shank.

In testimony whereof I affix my signature in presence of two witnesses.

CHARLES H. FELTEN.

Witnesses:
  NORBERT J. TOPPER,
  NORMAN A. LONG.